United States Patent [19]

McCausland

[11] 4,436,544

[45] Mar. 13, 1984

[54] ALUMINUM BRONZE GLASSMAKING MOLDS

[75] Inventor: Thomas W. McCausland, Brockway, Pa.

[73] Assignee: Brockway, Inc. (NY), Brockway, Pa.

[21] Appl. No.: 442,006

[22] Filed: Nov. 16, 1982

[51] Int. Cl.$^3$ .............................................. C03B 11/00
[52] U.S. Cl. ................................ 65/374.12; 429/135; 420/486; 420/487; 65/305
[58] Field of Search ................ 65/374.12, 374.11, 305; 249/135; 420/486, 487

[56] References Cited

U.S. PATENT DOCUMENTS

| | | | |
|---|---|---|---|
| 2,430,419 | 11/1947 | Edens | 420/486 |
| 2,798,826 | 7/1957 | Klement | 420/486 X |
| 3,258,334 | 6/1966 | Kessler | 420/486 |
| 3,424,569 | 1/1969 | Huebner | 65/374.12 X |
| 3,901,692 | 8/1975 | Mikawa | 420/486 |

*Primary Examiner*—Robert L. Lindsay, Jr.
*Attorney, Agent, or Firm*—Burns, Doane, Swecker & Mathis

[57] ABSTRACT

The present invention provides aluminum bronze glassmaking molds. The molds are substantially free of zinc and lead, consist essentially of manganese, nickel, iron, aluminum and copper, and exhibit superior wear resistance, durability, pitting and oxidation resistance, and machinability as compared to prior art glassmaking molds. Further, the aluminum bronze glassmaking molds of the present invention have a heretofore unavailable range of thermal conductivities at elevated temperatures so as to optimize the rate of glass forming in, e.g., Hartford Individual Section glass forming machines.

24 Claims, No Drawings

ALUMINUM BRONZE GLASSMAKING MOLDS

BACKGROUND OF THE INVENTION

1. Field of the Invention

The present invention provides aluminum bronze glassmaking molds. The molds of the present invention allow for efficient rates of glass forming and exhibit excellent physical characteristics.

2. Description of the Prior Art

While glassmaking is an ancient art, modern glassmaking can be traced to Ingle, U.S. Pat. No. 1,911,119, the content of which is hereby incorporated by reference. The conventional Hartford Individual Section glassware forming machine, such as disclosed in U.S. Pat. No. 1,911,119, may be of the "press and blow" type, exemplified by Rowe, U.S. Pat. No. 4,002,454, the content of which is hereby incorporated by reference, or of the "blow and blow" type, exemplified by Nebelung et al., U.S. Pat. No. 4,009,018, the content of which is also hereby incorporated by reference. Cf. Nebelung et al., U.S. Pat. No. 4,070,174, and Braithwaite, U.S. Pat. Nos. 4,222,761 and 4,222,762.

Both types of the Hartford I.S. glassware forming machine require the glassmaker to use a myriad of individual molds for the numerous molded sections. Such sections include blanks, molds, neck rings, plungers, blowheads, finish sleeves, baffles and bottom plates in both "press and blow" and "blow and blow" types; the dummy guide ring, dummy sleeve, and funnel unique to the "blow and blow" type; and the plunger head, baffle body, and baffle insert unique to the "press and blow" type.

Cast iron, being inexpensive, easy to machine, and widely available, was used extensively as the mold material for each of the aforementioned molds. However, its low wear resistance due to low hardness, tensile and yield strengths, low resistance to oxidation, and tendency to thermal cracking cause cast iron to fail under the severe operating parameters of modern Hartford I.S. glass forming. These operating parameters partially result from the deisre of the glassmakers to form the glass much faster than in the original Hartford I.S. glass forming technique.

The rate of glass forming is a function of the thermal conductivity of the mold from which each individual glass section is produced. Even apart from its other shortcomings, cast iron is not suitable for many glass molding sections as, at a thermal conductivity of approximately 24–27 B.t.u./hr/ft$^2$/ft/°F. at 850° F., it either draws too much heat from the glass too quickly (i.e., its thermal conductivity is too high), or too little heat too slowly (i.e., its thermal conductivity is too low), and thereby causes glass forming difficulties with many individual glass sections.

The establishment of an optimum glass forming rate requires that the thermal conductivity of the mold of each individual section be carefully circumscribed. For example, the bottom plate and neck ring in "blow and blow" molding should be produced in molds characterized by a thermal conductivity of about 25–37 B.t.u./hr/ft$^2$/ft/°F. at 850° F. while "blow and blow" finish guide plates or "press and blow" plungers should be molded in low thermal conductivity environments, i.e., from 18–20 B.t.u./hr/ft$^2$/ft/°F. at 850° F.

Prior art nickel-boron or stainless steel alloys that exhibit good wear resistance and low thermal conductivity are difficult to machine and too expensive for wide commercial application. The thermal conductivities of the aluminum bronze alloys disclosed in U.S. Pat. Nos. 3,258,334 and 3,405,015 are too high for many glass sections, resulting in glass forming difficulties. Commonly used cast aluminum bronzes, having the nominal chemical composition of 15% nickel, 10% aluminum, 9.0% zinc, 0.5% iron, 0.2% manganese, 0.2% lead, and the balance copper, suffer from pitting corrosion due to sulfur in the swab dope preferentially corroding the copper-zinc rich phase, and from the zinc leaving the microstructure of the alloy at elevated temperatures. The lead in such alloys also contributes to the pitting corrosion. Further, such alloys thermal conductivity of approximately 38.0 B.t.u./hr/ft$^2$/ft/°F. at 850° F. is again too high for most glass sections.

Another prior art aluminum bronze alloy employed in glass molds has a chemical composition as follows: 9–9.5% aluminum, 4.5–5% nickel, 4–4.5% iron, and the balance copper. This alloy is reported to suffer from reduced wear resistance, and a thermal conductivity essentially equal to cast aluminum bronzes.

Also used for glass molds is an aluminum bronze with a nominal chemical composition of 7.80% aluminum, 4.21% nickel, 5.41% iron, 1.20% manganese, 0.06% silicon, and the balance copper. This alloy suffers from low strength and poor pitting resistance, and its thermal conductivity of approximately 36 B.t.u./hr/ft$^2$/ft/°F. at 850° F. is too high for most glass sections.

Thus, it can be seen that the various glass molding materials of the prior art suffer from a variety of drawbacks. The lack of durable, cost-effective, easily maintained, wear and pitting corrosion resistant molds with a variety of low-to-moderate thermal conductivities at elevated temperatures, prevents the rapid glass forming required by modern glassmaking. Further, the prior art's use of a wide variety of metallurgically diverse alloys exacerbates the cost and difficulty involved in maintaining the various equipment needed to machine and repair the myriad molds utilized in a Hartford I.S. glass forming apparatus.

Therefore, it is an object of the present invention to provide a series of aluminum bronze alloyed molds for use in the molding of individual sections in glassmaking processes.

It is also an object of the present invention to provide a series of glass molds produced from aluminum bronze alloys that exhibit a wide variety of low-to-moderate thermal conductivities at elevated temperatures.

It is also an object of the present invention to provide a series of aluminum bronze molds that allow efficient glass forming in glassmaking processes.

It is a further object of the present invention to provide a series of aluminum bronze molds that have excellent wear and pitting corrosion resistance, are durable, and are particularly suited for the hot-end molding of glass.

It is another object of the present invention to provide a series of aluminum bronze alloy molds that are substantially free of zinc and lead and are particularly suited for glass molding in a Hartford I.S. type glass forming machine.

It is also an object of the present invention to provide a series of aluminum bronze alloy molds that may be easily machined and repaired.

SUMMARY OF THE INVENTION

Accordingly, a major object of the present invention is the provision of an improved class of glassmaking molds or mold segments/halves adapted for use on any glassware forming machine, whether conventional or otherwise, for the shaping of a broad spectrum of glass containers and like articles, e.g., bottles, jars, drinking glasses, etc.

Briefly, this invention features an entire series of glassmaking mold parts, whether upwardly open parison or blank molds, neck ring molds, blow molds, intermediate molds, mold cavities, or the like, and whether solid, split, segmented or otherwise comprising mold halves, which mold parts are cast, cast and machined, or otherwise shaped from a well-defined aluminum bronze alloy composition. The subject aluminum bronze alloys especially adapted for the shaping of glassmaking mold parts consistent herewith essentially consist of copper, aluminum, nickel, iron and manganese, present in certain well-defined proportions, and are essentially devoid of both zinc and lead.

The subject aluminum bronze alloy compositions, moreover, are readily melted and cast, and any mold structure shaped therefrom according hereto is notably hard, strong, oxidation, corrosion and wear resistant, and displays such desiderata as easy machineability, susceptibility to easy weld repair, and a hitherto unavailable range of thermal conductivities on heat transfer coefficients enabling optimization of the rate of glassmaking in the state-of-the-art glassware forming machines, e.g., a conventional Hartford I.S. type of glassware forming machine; too, the product mold structures according to this invention are cost effective.

DETAILED DESCRIPTION OF THE INVENTION

More particularly, according to this invention, the compositions of those aluminum bronze alloys especially adapted for the shaping of glassmaking mold parts therefrom are as follows:

TABLE 1

| Alloy | Composition (percent by weight) | | | | |
|---|---|---|---|---|---|
| | Mn | Ni | Fe | Al | Cu |
| 1 | 0.5 or less | 3.5–4.5 | 3.5–4.5 | 10.5–11.5 | 80.0–82.0 |
| 2 | 1.1–3.0 | 2.0–10.0 | 0.1–6.0 | 8.0–14.0 | 69.0–87.0 |
| 3 | 3.1–5.0 | 2.0–10.0 | 0.1–6.0 | 8.0–14.0 | 67.0–85.0 |
| 4 | 6.1–8.0 | 2.0–10.0 | 0.1–6.0 | 8.0–14.0 | 66.0–84.0 |
| 5 | 9.1–11.0 | 2.0–10.0 | 0.1–6.0 | 8.0–14.0 | 65.0–83.0 |
| 6 | 11.1–13.0 | 2.0–10.0 | 0.1–6.0 | 8.0–14.0 | 64.0–82.0 |

These alloys are essentially devoid of both zinc and lead, the two elements found to reduce pitting corrosion resistance. Also, their nickel, aluminum and iron components are sufficient to provide excellent strength, hardness and oxidation resistance. Further, these alloys are easy to cast and machine into molds, while the molds are easily weld-repaired.

Various typical physical properties of the compositions of the aluminum bronze alloys especially adapted for the shaping of glassmaking mold parts therefrom are as follows:

TABLE 2

| Alloy | STRENGTH | | | HARDNESS | | |
|---|---|---|---|---|---|---|
| | Ultimate Tensile Strength (PSI) | Yield Strength (PSI) | Elongation (%) | As Cast (BHN) | Oil Quenched (BHN) | Water Quenched (BHN) |
| 1 | 100,000 | 44,000 | 26 | 222 | 265 | 255 |
| 2 | 98,000 | 45,000 | 15 | 179 | 255 | 255 |
| 3 | 95,000 (est) | 45,000 (est) | 15 (est) | 185 (est) | 240 (est) | 240 (est) |
| 4 | 102,000 | 38,000 | 16 | 190 | 230 | 230 |
| 5 | 118,185 | 66,225 | 14 | 210 | 270 | 265 |
| 6 | 95,000 | 45,000 | 12 | 207 | 285 | 302 |

Moreover, it has been found that at elevated temperatures the thermal conductivity of these alloys decreases linearly as the manganese content increases. This variation of the percentage by weight of manganese enables these alloys to exhibit the following wide range of thermal conductivities at 850° F.:

TABLE 3

| Alloy | Thermal Conductivity in B.t.u./hr/ft$^2$/ft/° F. |
|---|---|
| 1 | 37 |
| 2 | 33 |
| 3 | 30 (estimated) |
| 4 | 25 |
| 5 | 20 |
| 6 | 18 |

The superior molds of the present invention provide the glassmaker with easily machined and maintained molds that are characterized by a range of thermal conductivities critical to the optimization of the rate of glass forming in a Hartford I.S. type glass forming machine.

Molds produced from Alloys 1–6 are used as follows:
(i) Alloy 6 replaces molds made from prohibitively expensive stainless steel or nickel-boron alloys where low thermal conductivity is required;
(ii) Alloy 5 provides superior glass molds whose thermal conductivity lies between that of stainless steel or nickel-boron alloys and that of cast iron, while Alloys 3 and 2 provide glass molds with thermal conductivities between that of cast iron and presently used cast aluminum bronzes. Heretofore, no known glass mold alloys provided these intermediate thermal conductivities while inhibiting the excellent physical characteristics required for hot-end glass molding. Such intermediate thermal conductivities are critical to facilitate glass forming in various mold parts such as "press and blow" neck rings;
(iii) Alloy 4 provides molds that are superior to and more durable than molds produced from cast iron; and
(iv) molds machined from Alloy 1 have the thermal conductivity of cast aluminum bronze molds but are much less expensive and do not suffer from pitting.

Specifically, the various thermal conductivities of the alloy molds of the present invention particularly enhance glass forming rates in the following applications in Hartford I.S. glass forming machines:

TABLE 4

| "Blow and Blow" Machine Type | |
|---|---|
| Mold Part | Alloy |
| Blank | 4 |
| Neck Ring | 1 |
| Finish Guide Plate | 5 or 6 |
| Finish Sleeve | 5 or 6 |
| Mold | 1 to 4 |
| Funnel | 1 to 6 |

TABLE 5

| "Press and Blow" Machine Type | |
|---|---|
| Mold Part | Alloy |
| Blow Head | 1 to 6 |
| Baffle Insert | 5 to 6 |
| Baffle Body | 1 to 6 |
| Plunger | 1 to 4 |
| Neck Ring | 4 to 6 |
| Blank | 4 |

Alloys within the compositional ranges of Alloys 1 and 6 are per se known. Alloys 2-5 may be conventionally prepared by combining certain proportions of Alloys 1 and 2; e.g., Alloy 3 consists of one part of Alloy 6 to two parts of Alloy 1. The molds of the present invention are conventionally fashioned by preparing a melt of the desired alloy, casting said melt into a sand mold, and, upon removal of the casting, machining said casting into the desired mold part.

The following Examples are given as specific illustrations of the invention. It should be understood, however, that the invention is not limited to the specific details set forth in the Examples.

EXAMPLE I

Alloy 4 was prepared by combining three parts of Alloy 6 and two parts of Alloy 1. The resultant alloy was cast and easily machined into a mold for "blow and blow" baffles. A set of these baffles were placed into service and run for more than 57,380 gross shear cuts. The baffles ran trouble-free, exhibited excellent wear resistance, and did not pit or crack.

EXAMPLE II

Alloy 1 was cast and easily machined into two complete sets of "blow and blow" molds and bottom plates for bottlemaking. The sets produced an average of 6079 gross shear cuts per mold. The mold parts ran trouble-free with excellent wear and corrosion resistances.

Although the invention has been described with preferred embodiments, it is to be understood that variations and modifications may be employed as will be apparent to those skilled in the art. Such variations and modifications are to be considered within the scope of the claims appended hereto.

What is claimed is:

1. A glassmaking mold part adapted for use in a glassware forming machine, which comprises a mold member shaped from an aluminum bronze alloy composition essentially consisting of (i) less than about 0.5% by weight manganese, (ii) from about 3.5 to about 4.5% by weight of nickel, (iii) from about 3.5 to about 4.5% by weight of iron, (iv) from about 10.5 to about 11.5% by weight aluminum, with (v) the balance copper, and (vi) said composition being substantially devoid of both zinc and lead.

2. The glassmaking mold part as defined by claim 1, the same having a thermal conductivity of about 37 B.t.u./hr/ft$^2$/ft/°F. at about 850° F.

3. A glassmaking mold part adapted for use in a glassware forming machine, which comprises a mold member shaped from an aluminum bronze alloy composition essentially consisting of (i) from about 1.1 to about 3.0% by weight of manganese, (ii) from about 2.0 to about 10% by weight of nickel, (iii) from about 0.1 to about 6.0% by weight of iron, (iv) from about 8.0 to about 14.0% by weight of aluminum, with (v) the balance copper, and (vi) said composition being substantially devoid of both zinc and lead.

4. The glassmaking mold part as defined by claim 3, the same having a thermal conductivity of about 33 B.t.u./hr/ft$^2$/ft/°F. at about 850° F.

5. A glassmaking mold part adapted for use in a glassware forming machine, which comprises a mold member shaped from an aluminum bronze alloy composition essentially consisting of (i) from about 3.1 to about 5.0% by weight of manganese, (ii) from about 2.0 to about 10.0% by weight of nickel, (iii) from about 0.1 to about 6.0% by weight of iron, (iv) from about 8.0 to about 14.0% by weight of aluminum, with (v) the balance copper, and (vi) said composition being substantially devoid of both zinc and lead.

6. The glassmaking mold part as defined by claim 5, the same having a thermal conductivity of about 30 B.t.u./hr/ft$^2$/ft/°F. at about 850° F.

7. A glassmaking mold part adapted for use in a glassware forming machine, which comprises a mold member shaped from an aluminum bronze alloy composition essentially consisting of (i) from about 6.1 to about 8.0% by weight of manganese, (ii) from about 2.0 to about 10.0% by weight of nickel, (iii) from about 0.1 to about 6.0% by weight of iron, (iv) from about 8.0 to about 14.0% by weight of aluminum, with (v) the balance copper, and (vi) said composition being substantially devoid of both zinc and lead.

8. The glassmaking mold part as defined by claim 7, the same having a thermal conductivity of about 25 B.t.u./hr/ft$^2$/ft/°F. at about 850° F.

9. A glassmaking mold part adapted for use in a glassware forming machine, which comprises a mold member shaped from an aluminum bronze alloy composition essentially consisting of (i) from about 9.1 to about 11.0% by weight of manganese, (ii) from about 2.0 to about 10.0% by weight of nickel, (iii) from about 0.1 to about 6.0% by weight of iron, (iv) from about 8.0 to about 14.0% by weight of aluminum, with (v) the balance copper, and (vi) said composition being substantially devoid of both zinc and lead.

10. The glassmaking mold part as defined by claim 9, the same having a thermal conductivity of about 20 B.t.u./hr/ft$^2$/ft/°F. at about 850° F.

11. A glassmaking mold part adapted for use in a glassware forming machine, which comprises a mold member shaped from an aluminum bronze alloy composition essentially consisting of (i) from about 11.1 to about 13.0% by weight of manganese, (ii) from about 2.0 to about 10.0% by weight of nickel, (iii) from about 0.1 to about 6.0% by weight of iron, (iv) from about 8.0 to about 14.0% by weight of aluminum, with (v) the balance copper, and (vi) said composition being substantially devoid of both zinc and lead.

12. The glassmaking mold part as defined by claim 11, the same having a thermal conductivity of about 18 B.t.u./hr/ft$^2$/ft/°F. at about 850° F.

13. In a glassware forming machine comprising at least one glassmaking mold member, the improvement which comprises including as at least one of the mold members therefor, a glassmaking mold part as defined by claim 1.

14. In a glassware forming machine comprising at least one glassmaking mold member, the improvement which comprises including as at least one of the mold members therefor, a glassmaking mold part as defined by claim 3.

15. In a glassware forming machine comprising at least one glassmaking mold member, the improvement which comprises including as at least one of the mold members therefor, a glassmaking mold part as defined by claim 5.

16. In a glassware forming machine comprising at least one glassmaking mold member, the improvement which comprises including as at least one of the mold members therefor, a glassmaking mold part as defined by claim 7.

17. In a glassware forming machine comprising at least one glassmaking mold member, the improvement which comprises including as at least one of the mold members therefor, a glassmaking mold part as defined by claim 9.

18. In a glassware forming machine comprising at least one glassmaking mold member, the improvement which comprises including as at least one of the mold members therefor, a glassmaking mold part as defined by claim 11.

19. In a process for the molding of glassware in a glassware forming machine comprising at least one glassmaking mold member, the improvement which comprises including as at least one of the mold members for said glassware forming machine, a glassmaking mold part as defined by claim 1.

20. In a process for the molding of glassware in a glassware forming machine comprising at least one glassmaking mold member, the improvement which comprises including as at least one of the mold members for said glassware forming machine, a glassmaking mold part as defined by claim 3.

21. In a process for the molding of glassware in a glassware forming machine comprising at least one glassmaking mold member, the improvement which comprises including as at least one of the mold members for said glassware forming machine, a glassmaking mold part as defined by claim 5.

22. In a process for the molding of glassware in a glassware forming machine comprising at least one glassmaking mold member, the improvement which comprises including as at least one of the mold members for said glassware forming machine, a glassmaking mold part as defined by claim 7.

23. In a process for the molding of glassware in a glassware forming machine comprising at least one glassmaking mold member, the improvement which comprises including as at least one of the mold members for said glassware forming machine, a glassmaking mold part as defined by claim 9.

24. In a process for the molding of glassware in a glassware forming machine comprising at least one glassmaking mold member, the improvement which comprises including as at least one of the mold members for said glassware forming machine, a glassmaking mold part as defined by claim 11.

* * * * *

UNITED STATES PATENT AND TRADEMARK OFFICE
CERTIFICATE OF CORRECTION

PATENT NO. : 4,436,544
DATED     : March 13, 1984
INVENTOR(S) : Thomas W. McCausland It is certified that error appears in the above-identified patent and that said Letters Patent is hereby corrected as shown below:

Column 1, line 42, delete "deisre", insert --desire--;

Table 3, delete "33" as an alloy designation, insert --2--;

Table 3, insert --33-- as the thermal conductivity of Alloy 2; and

Column 5, line 27, delete "2", insert --6--.

Signed and Sealed this

Sixth Day of November 1984

[SEAL]

Attest:

Attesting Officer

GERALD J. MOSSINGHOFF
Commissioner of Patents and Trademarks